(12) United States Patent
Zhou et al.

(10) Patent No.: US 8,922,731 B2
(45) Date of Patent: Dec. 30, 2014

(54) BACKLIGHT MODULE AND LCD DEVICE COMPRISING BACKLIGHT MODULE

(75) Inventors: Gege Zhou, Shenzhen (CN); Jianfa Huang, Shenzhen (CN)

(73) Assignee: Shenzhen China Star Optoelectronics Technology Co., Ltd., Shenzhen (CN)

(*) Notice: Subject to any disclaimer, the term of this patent is extended or adjusted under 35 U.S.C. 154(b) by 230 days.

(21) Appl. No.: 13/508,420

(22) PCT Filed: Mar. 29, 2012

(86) PCT No.: PCT/CN2012/073225
§ 371 (c)(1),
(2), (4) Date: May 7, 2012

(87) PCT Pub. No.: WO2013/143095
PCT Pub. Date: Oct. 3, 2013

(65) Prior Publication Data
US 2013/0258243 A1    Oct. 3, 2013

(51) Int. Cl.
*G02F 1/1333*    (2006.01)

(52) U.S. Cl.
USPC .......................................................... 349/58

(58) Field of Classification Search
USPC .......................................................... 349/58
See application file for complete search history.

(56) References Cited

U.S. PATENT DOCUMENTS

| | | | |
|---|---|---|---|
| 6,811,276 B2 | 11/2004 | Moon | |
| 2008/0285304 A1* | 11/2008 | Rankin et al. | 362/602 |
| 2010/0073903 A1* | 3/2010 | Yun et al. | 362/97.1 |
| 2011/0205755 A1 | 8/2011 | Kiyohara | |

FOREIGN PATENT DOCUMENTS

| | | |
|---|---|---|
| CN | 1504810 A | 6/2004 |
| CN | 1873495 A | 12/2006 |
| CN | 201174015 Y | 12/2008 |
| CN | 101452150 A | 6/2009 |
| CN | 102081259 A | 6/2011 |
| CN | 102214773 A | 10/2011 |
| JP | 2003242822 A | 8/2003 |

OTHER PUBLICATIONS

Li Qingqing, the International Searching Authority written comments, Jan. 2013, CN.

* cited by examiner

*Primary Examiner* — Timothy L Rude
(74) *Attorney, Agent, or Firm* — IPro, Inc.; Na Xu

(57) ABSTRACT

The invention relates to the field of LCDs, and more particularly to a backlight module and an LCD device comprising the backlight module. The backlight module includes a middle frame, a light guide panel, and a light source; the backlight module further includes a shielding structure which is used for preventing the light of the light source from being directly emitted from the gap between the middle frame and the light guide panel; the shielding structure includes a groove arranged in the middle frame, and a convex lug arranged on the light guide panel; the convex lug is arranged in the groove. Because of the existence of the shielding structure, the light cannot be directly emitted onto the optical film from the gap between the middle frame and the light guide panel; thus, the problem of light leakage is solved; therefore, the bright line and facula cannot be generated on the LCD panel, thereby improving the quality of the LCD device.

17 Claims, 2 Drawing Sheets

BACKLIGHT MODULE AND LCD DEVICE COMPRISING BACKLIGHT MODULE

TECHNICAL FIELD

The invention relates to the field of liquid crystal displays (LCDs), and more particularly to a backlight module and an LCD device comprising the backlight module.

BACKGROUND

LCD devices are widely applied in recent years because of the advantages of low power consumption, low manufacturing cost, no radiation, etc. As shown in FIG. 1, an LCD device mainly includes a backlight module 1, and an LCD panel 2; the backlight module 1 here is an edge-light backlight module of a bottom-light type, is a crucial thought for designing LCD devices with narrow frames, and can achieve the aim of the design of the minimum frame of 4.3 mm. Because a light guide panel 11 can generate heat expansion and cold contraction during operation, and has manufacturing tolerance, etc., a certain assembling gap is reserved between the end surface of the light guide panel 11 and a middle frame 12, resulting in light leakage. The light of a light source 3 is directly emitted from the aforementioned gap. Because the light is bright, bright line(s) may be formed at the frame of an LCD panel 2 after the light penetrates through an optical film 13, and local facula may be formed in severe conditions, causing the quality of the LCD device to decline.

SUMMARY

In view of the above-described problems, the aim of the invention is to provide a backlight module without light leakage and an LCD device.

A first technical scheme of the invention is that: a backlight module comprises a middle frame, a light guide panel, and a light source; the backlight module further comprises a shielding structure which is used for preventing the light of the light source from being directly emitted from the gap between the middle frame and the light guide panel; the shielding structure comprises a groove arranged in the middle frame, and a convex lug arranged on the light guide panel; the convex lug is arranged in the groove, the shape of the convex lug corresponds to that of the groove, the cross section of the convex lug is in a triangle shape, the length of the convex lug is more than or equal to that of the light source, and the convex lug is an independent component and is integrated with the light guide panel by assembling; the convex lug comprises a root, the edge of the light guide panel is provided with a T-shaped notch, and the root of the convex lug is arranged in the notch and integratedly fixes the convex lug and the light guide panel. The backlight module is a bottom-light backlight module.

A second technical scheme of the invention is that: a backlight module comprises a middle frame, a light guide panel, and a light source; the backlight module further comprises a shielding structure which is used for preventing the light of the light source from being directly emitted from the gap between the middle frame and the light guide panel; the shielding structure comprises a groove arranged in the middle frame, and a convex lug arranged on the light guide panel; the convex lug is arranged in the groove.

Preferably, the shape of the convex lug corresponds to that of the groove; thus, the matching structure of the convex lug and the groove has a positioning function.

Preferably, the cross section of the convex lug is in a rectangle shape.

Preferably, the cross section of the convex lug is in a triangle shape.

Preferably, the length of the convex lug is more than or equal to that of the light source, so as to totally shield the light.

Preferably, the convex lug is an independent component, and is integrated with the light guide panel by assembling. The light guide panel can be directly designed into a rectangle shape. Because the utilization rate of the panel is high during cutting, and the width of the convex lug is small, the convex lug can be made of the leftover material of the panel.

Preferably, the convex lug is stuck onto the light guide panel.

Preferably, the convex lug comprises a root; the edge of the light guide panel is provided with a T-shaped notch, and the root of the convex lug is arranged in the notch and integratedly fixes the convex lug and the light guide panel.

Preferably, the backlight module is a bottom-light backlight module. The width of the frame of the LCD device can be further narrowed, thereby achieving the design goal of ultra-narrow frames.

A third technical scheme of the invention is that: an LCD device comprises a backlight module; the backlight module comprises a middle frame, a light guide panel, and a light source; the backlight module further comprises a shielding structure which is used for preventing the light of the light source from being directly emitted from the gap between the middle frame and the light guide panel; the shielding structure comprises a groove arranged in the middle frame, and a convex lug arranged on the light guide panel; the convex lug is arranged in the groove.

Preferably, the shape of the convex lug corresponds to that of the groove; thus, the matching structure of the convex lug and the groove has a positioning function.

Preferably, the cross section of the convex lug is in a rectangle shape.

Preferably, the cross section of the convex lug is in a triangle shape.

Preferably, the length of the convex lug is more than or equal to that of the light source, so as to totally shield the light.

Preferably, the convex lug is an independent component, and is integrated with the light guide panel by assembling. The light guide panel can be directly designed into a rectangle shape. During cutting, because the utilization rate of the panel is high, and the width of the convex lug is small, the convex lug can be made of the leftover material of the panel.

Preferably, the convex lug is stuck onto the light guide panel.

Preferably, the convex lug comprises a root; the edge of the light guide panel is provided with a T-shaped notch, and the root of the convex lug is arranged in the notch and integratedly fixes the convex lug and the light guide panel.

Preferably, the backlight module is a bottom-light backlight module. The width of the frame of the LCD device can be further narrowed, thereby achieving the design goal of ultra-narrow frames.

Advantages of the invention are summarized below: the backlight module of the invention comprises a shielding structure which is used for preventing the light of the light source from being directly emitted from the gap between the middle frame and the light guide panel; the shielding structure comprises a groove arranged in the middle frame, and a convex lug arranged on the light guide panel; the convex lug is arranged in the groove. Because of the existence of the shielding structure, the light cannot be directly emitted onto the optical film from the gap between the middle frame and the light guide panel; thus, the problem of light leakage is solved; therefore, the bright line and facula cannot be generated on the LCD panel, thereby improving the quality of the LCD.

Legends: 1 backlight module; 11. light guide panel; 111. convex lug; 112. root; 113. notch; 12. middle frame; 121. groove; 13. optical film; 2. LCD panel; 3. light source.

DETAILED DESCRIPTION

Figure 1:
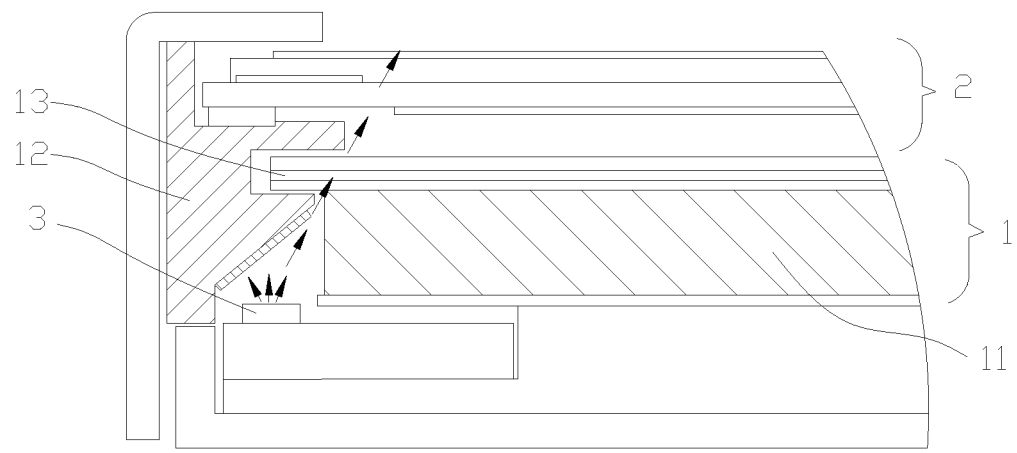
FIG. 1 is a structure diagram of an LCD device in the prior art.
Figure 2:
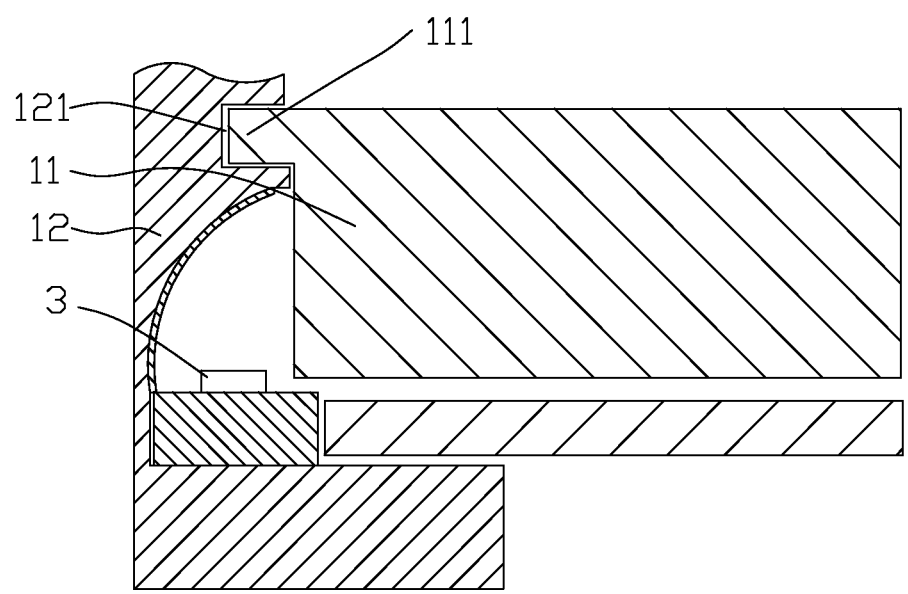
FIG. 2 is a partial structure diagram of a first example of a backlight module of the invention.
Figure 3:
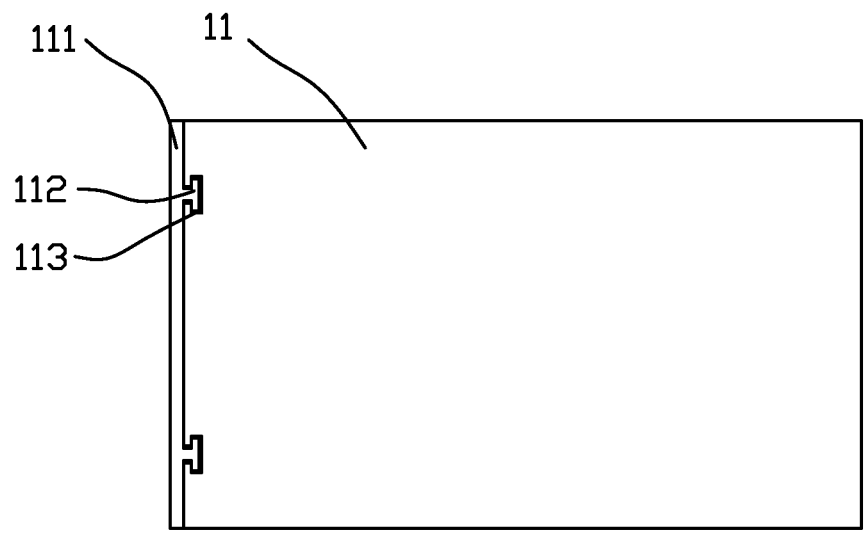
FIG. 3 is a structure diagram of a light guide panel shown in FIG. 2.

The invention provides an LCD device, comprising a backlight module. FIG. 2 and FIG. 3 show a first example of the backlight module of the invention. The backlight module is a bottom-light backlight module. The backlight module comprises a middle frame 12, a light guide panel 11, and a light source 3; the backlight module further comprises a shielding structure which is used for preventing the light of the light source 3 from being directly emitted from the gap between the middle frame 12 and the light guide panel 11; the shielding structure comprises a groove 121 arranged in the middle frame 12, and a convex lug 111 arranged on the light guide panel 11; the convex lug 111 is arranged in the groove 121. In the example, the cross section of the convex lug 111 is in a rectangle shape, and the shape of the convex lug 111 corresponds to that of the groove 121; thus, the matching structure of the convex lug 111 and the groove 121 has a positioning function. Preferably, the length of the convex lug is more than or equal to that of the light source, so as to totally shield the light.

Because the backlight module of the invention comprises the shielding structure which is used for preventing the light of the light source from being directly emitted from the gap between the middle frame and the light guide panel, namely the groove 121 arranged in the middle frame 12 and the convex lug 111 arranged on the light guide panel 11; the matching structure of the convex lug 111 and the groove 121 can shield the light, so that the light cannot be directly emitted onto the optical film from the gap between the middle frame 12 and the light guide panel 11; thus, the problem of light leakage is solved; therefore, the bright line and facula cannot be generated on the LCD panel, thereby improving the quality of the LCD device. In addition, the convex lug 111 arranged on the light guide panel 11 can be used as an acting point of the middle frame 12 for fixing the light guide panel 11, namely the light guide panel 11 is clamped and fixed in the upper and lower directions, the light guide panel 11 is firmly positioned, and the buckling deformation of the light guide panel 11 is avoided.

In addition, because the position where the middle frame 12 clamps the light guide panel 11 is positioned outside the light incident surface of the light guide panel 11 instead of being extended into the light incident surface, the width of the frame of the LCD device is further narrowed by about 2 mm, and then the design goal of ultra-narrow frames is achieved.

Because the light guide panel 11 is mainly formed by cutting and processing, the convex lug 111 arranged at the edge of the light guide panel 11 may cause the reduction of the utilization rate of the panel, resulting in material waste. To solve the problem, in the invention, the convex lug 111 is separately made into an independent component with the same material as the light guide panel 11; as shown in FIG. 3, the light guide panel 11 is in a rectangle shape, and the edge of the light guide panel 11 is provided with a T-shaped notch 113; the convex lug 111 comprises a root 112, and the root 112 of the convex lug is arranged in the notch 113 and integratedly fixes the convex lug 111 and the light guide panel 11. Namely, the convex lug 111 and the light guide panel 11 are separately made, and then the convex lug 111 and the light guide panel 11 are integrated by assembling. Because the light guide panel is directly designed into a rectangle shape, the utilization rate of the panel is high during cutting, and the width of the convex lug 111 is small, the convex lug 111 can be made of the leftover material of the panel. Optionally, the convex lug 111 can be directly stuck onto the light guide panel 11.

Figure 4:
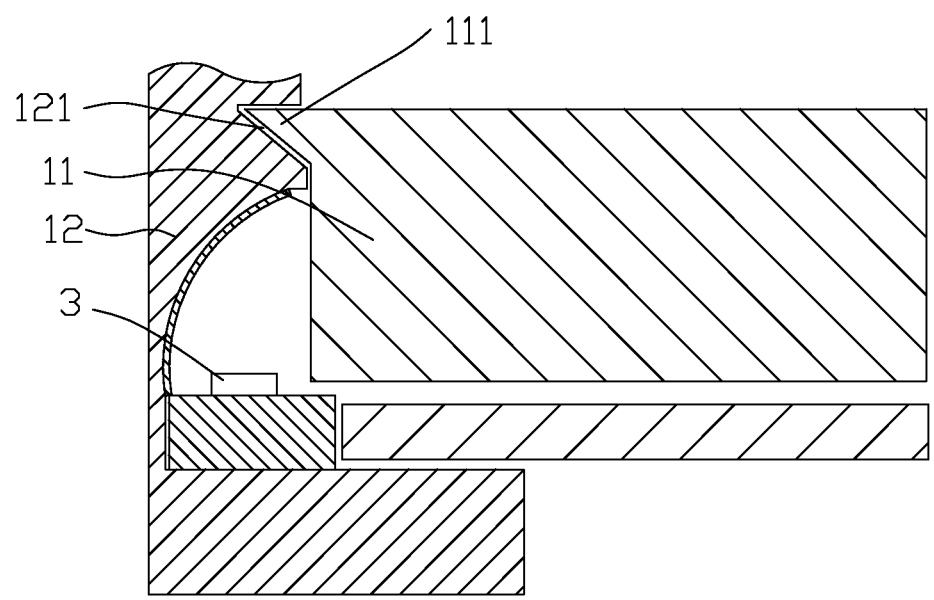
FIG. 4 is a partial structure diagram of a second example of a backlight module of the invention.

A second example of the backlight module of the invention is shown in FIG. 4, and the second example is different from the first example in that: the cross section of the convex lug 111 arranged on the light guide panel 11 is in a triangle shape, and the cross section of the groove 121 arranged in the middle frame 12 is in a triangle shape matched with the convex lug 111. The matching mode enables the middle frame 12 to powerfully clamp the part of the lower end surface of the convex lug 111 of the light guide panel 11; thus, the light guide panel 11 is preferably fixed, and the buckling deformation of the light guide panel 11 is preferably avoided. Because other structures and advantages coincide with those of the first example, the second example will not give unnecessary details.

The invention is described in detail in accordance with the above contents with the specific preferred examples. However, this invention is not limited to the specific examples. For the ordinary technical personnel of the technical field of the invention, on the premise of keeping the conception of the present invention, the technical personnel can also make simple deductions or replacements, and all of which should be considered to belong to the protection scope of the invention.

The invention claimed is:

1. A backlight module, comprising: a middle frame, a light guide panel, and a light source; wherein said backlight module further comprises a shielding structure which is used for preventing the light of the light source from being directly emitted from the gap between the middle frame and the light guide panel; said shielding structure comprises a groove arranged in the middle frame, and a convex lug arranged on the light guide panel; said convex lug is arranged in said groove, the shape of said convex lug corresponds to that of said groove, the cross section of said convex lug is in a triangle shape, the length of said convex lug is more than or equal to that of said light source, and said convex lug is an independent component and is integrated with said light guide panel by assembling; said convex lug comprises a root, the edge of said light guide panel is provided with a T-shaped notch, and the root of said convex lug is arranged in said notch and integratedly fixes said convex lug and said light guide panel; the backlight module is a bottom-light backlight module.

2. A backlight module, comprising: a middle frame, a light guide panel, and a light source; wherein said backlight module further comprises a shielding structure which is used for preventing the light of the light source from being directly emitted from the gap between the middle frame and the light guide panel; said shielding structure comprises a groove arranged in the middle frame, and a convex lug arranged on the light guide panel; said convex lug is arranged in said groove, said convex lug comprises a root; the edge of said light guide panel is provided with a T-shaped notch, and the root of said convex lug is arranged in said notch and integratedly fixes said convex lug and said light guide panel.

3. The backlight module of claim 2, wherein the shape of said convex lug corresponds to that of said groove.

4. The backlight module of claim 2, wherein the cross section of said convex lug is in a rectangle shape.

5. The backlight module of claim 2, wherein the cross section of said convex lug is in a triangle shape.

6. The backlight module of claim 2, wherein the length of said convex lug is more than or equal to that of said light source.

7. The backlight module of claim 2, wherein said convex lug is an independent component, and is integrated with said light guide panel by assembling.

8. The backlight module of claim 7, wherein said the convex lug is stuck onto said light guide panel.

9. The backlight module of claim 2, wherein said backlight module is a bottom-light backlight module.

10. An LCD device, comprising: a backlight module; wherein said backlight module comprises a middle frame, a light guide panel, and a light source; said backlight module further comprises a shielding structure which is used for preventing the light of the light source from being directly emitted from the gap between the middle frame and the light guide panel; said shielding structure comprises a groove arranged in the middle frame, and a convex lug arranged on the light guide panel; said convex lug is arranged in said groove, said convex lug comprises a root; the edge of said light guide panel is provided with a T-shaped notch, and the root of said convex lug is arranged in said notch and integratedly fixes said convex lug and said light guide panel.

11. The LCD device of claim 10, wherein the shape of said convex lug corresponds to that of said groove.

12. The LCD device of claim 11, wherein the cross section of said convex lug is in a rectangle shape.

13. The LCD device of claim 10, wherein the cross section of said convex lug is in a triangle shape.

14. The LCD device of claim 10, wherein the length of said convex lug is more than or equal to that of said light source.

15. The LCD device of claim 10, wherein said convex lug is an independent component, and is integrated with said light guide panel by assembling.

16. The LCD device of claim 15, wherein said convex lug is stuck onto said light guide panel.

17. The LCD device of claim 10, wherein said backlight module is a bottom-light backlight module.

* * * * *